United States Patent

Leech et al.

[15] 3,695,011

[45] Oct. 3, 1972

[54] GAS FLOW DIFFUSER

[72] Inventors: Okie R. Leech; Ernest A. Dewey, both of Richmond, Va.

[73] Assignee: Texaco Inc., New York, N.Y.

[22] Filed: May 26, 1971

[21] Appl. No.: 147,053

[52] U.S. Cl.................................................55/386
[51] Int. Cl.........................................B01d 53/04
[58] Field of Search.....210/31 C, 198 C; 55/67, 197, 55/386

[56] References Cited

UNITED STATES PATENTS 3,422,604  1/1969  Haase..........................55/386

Primary Examiner—John Adee
Attorney—Thomas H. Whaley and Carl G. Ries

[57] ABSTRACT

For large-scale gas chromatography separation apparatus, a diffusing structure in between the inlet line and the packed column. There are a plurality of funnel-shaped coaxial baffles for spreading the gas flow into the column to reduce channeling in the column.

8 Claims, 2 Drawing Figures

PATENTED OCT 3 1972

3,695,011

GAS FLOW DIFFUSER

BACKGROUND OF THE INVENTION

Field of the Invention

This invention concerns a diffuser for gas flow distribution. It particularly relates to the field of large-scale gas chromatography.

SUMMARY OF THE INVENTION

Briefly, this invention is applicable to large-scale gas chromatography, wherein there is a packed column containing an adsorbent material in said column. It concerns the combination that comprises a funnel-shaped diffusing member for location at the inlet of said column, said inlet has a relatively small diameter compared to the diameter of said column. The said diffusing member comprises a plurality of concentric funnel-shaped impervious baffles for spreading the flow of gas evenly over the cross-sectional area of said column.

Once more, briefly, the invention concerns large-scale gas chromatography having a packed column containing an adsorbent material in said column. It relates to elements in a combination that includes an inlet diffusing member which comprises means for attaching a relatively small diameter inlet conduit coaxially with said column. It also comprises a plurality of impervious frusto-conical flared sheet material sections in series and integral with said attaching means. The said sections join said conduit with said column and form the outermost walls of said diffusing member. In addition, it comprises a second plurality of impervious frusto-conical flared sheet material sections in series and located coaxially inside said first-named sections. Said second sections act as a baffle and form inner walls of an annular passageway for spreading out part of the gas flow through said inlet conduit toward said column. It also comprises a plurality of additional frusto-conical flared sections located coaxially inside said second and succeeding sections and acting as baffles to form additional annular passageways. And, it comprises means for attaching said second and additional inner section baffles to one another in order to hold them in place.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein.

DESCRIPTION OF THE PREFERRED EMBODIMENT

In the field of gas chromatography, consideration is being given to large-scale operations for obtaining substantial quantity separations of products, such as hydro-carbons, that are difficult to isolate from one another. One problem that has been encountered in this field of endeavor is that of obtaining evenly distributed flow of the gaseous product that is being passed through a packed column. There is a tendency that the flowing gas becomes channeled in the relatively large-sized columns so that the effectiveness of the column becomes badly impaired. While a proposal for distributing the gas flow has been disclosed in a copending application (Ser. No. 25,430, filed Apr. 3, 1970 by F. R. Davis, Jr., and E. A. Dewey, titled SEPARATION SYSTEM FOR THE RESOLVING OF VOLATILE MIXTURES), it does not create the most evenly distributed flow of gas as it comes from the inlet to the input end of the column. And, this is particularly true under certain velocities of gas flow.

Figure 1:
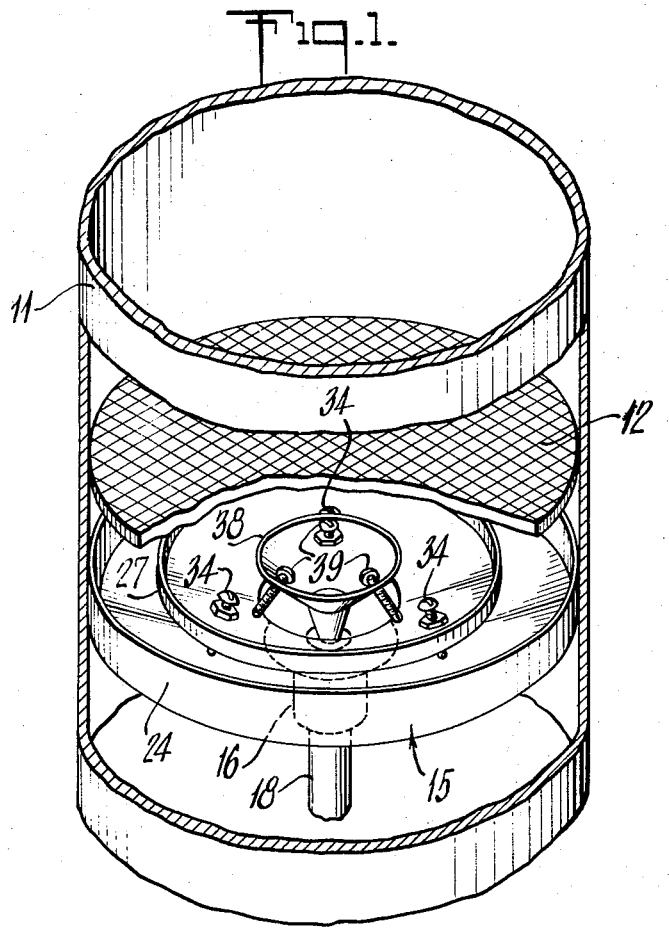
FIG. 1 is a perspective, broken away in cross-section, and showing a diffuser in place at one end of a column according to the invention.

Referring to FIG. 1 of the drawings, it will be noted that there is a cylindrical outer housing 11 that contains a large-scale packed column (not shown) for causing chromatographic separations. Within the housing 11, there may be one or more discs, such as a disc 12 schematically shown, which has honeycomb partitions or the like to help maintain an axial flow of the gases within housing 11.

Figure 2:
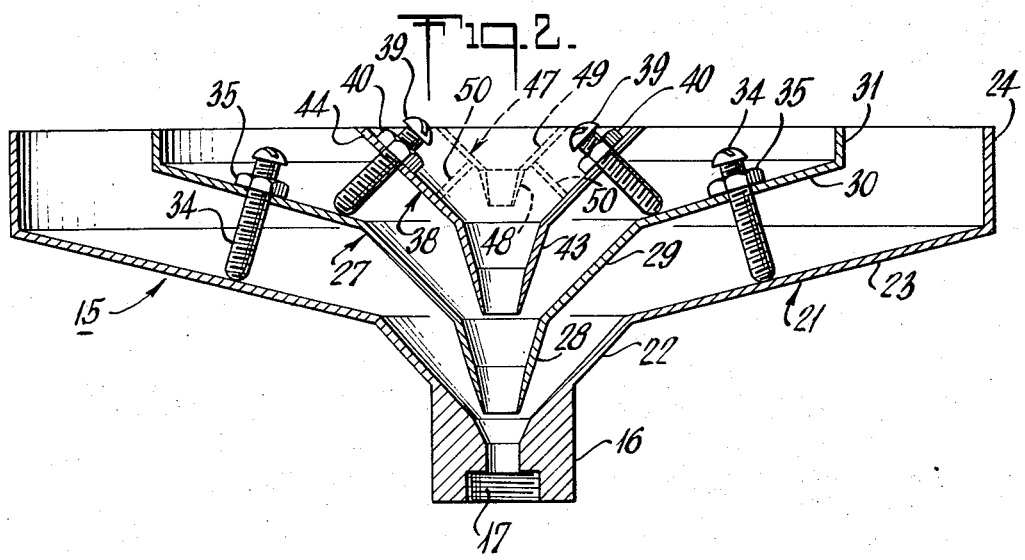
FIG. 2 is an enlarged transverse cross-section view showing the diffuser according to FIG. 1 and, additionally, including a further similar cone-shaped baffle in dashed lines.

Beneath the disc 12 and inside housing 11, there is a diffusing member 15 that is shown somewhat enlarged in transverse cross-section in FIG. 2. This diffusing member 15 has a small-diameter coupling 16 that has an internally threaded opening 17 for receiving a conduit 18 (FIG. 1) through which the hydrocarbon gases to be separated will flow.

Integrally attached to the coupling 16, there is a funnel-shaped portion 21 that is made up of a series of conical sections 22, 23 and a cylindrical section 24. These form the outer walls of the diffusing member 15. Inside, and coaxially situated, there is a similarly funnel-shaped baffle 27. It has three conical portions 28, 29 and 30 plus a shorter cylindrical outer portion 31. This baffle 27 may be held in place in various ways but, as shown in the drawings, is adjustably supported on top of the outer portion 21 by having three screws 34 situated spaced circumferencially 120 degrees apart and held in place by correspondingly threaded nuts 35. The nuts 35 are attached to the surface of the baffle 27 in any feasible manner.

There is a third baffle 38 that is located coaxially with the outer portion 21 and the baffle 27. This inner baffle is supported inside of and above baffle 27 by means of three adjustable screws 39 that have nuts 40 for cooperation therewith. The nuts 40 are attached to the surface of the outer portion of baffle 38 in any feasible manner.

It will be observed that the baffle 38 is made up of two conical sections 43 and 44 with the nuts 40 attached to the section 44. Here again, it will be appreciated that other types of structure might be employed for supporting baffle 38 in place. However, by employing the adjustable screws 39, flow conditions may be adjusted for circumferential balance.

It will be noted that there is indicated in FIG. 2 only, a further baffle 47 shown in dashed lines. It has two conical sections 48 and 49, and it is situated coaxially with the other baffles. It is held in place by any feasible structure, e.g., a plurality of bars 50, extending between baffle 47 and baffle 38.

It will be understood from the foregoing that the flow of gases into the large diameter column will be evenly spread out, or diffused, over the entire cross-sectional area of the packed column (not shown) which is located above the diffuser 15 in housing 11. Such spreading-out of the gas flow will tend to minimize or eliminate any channeling which would reduce or impair the effectiveness of the packed column.

It will be understood that any feasible number of concentric baffles might be employed and it would vary depending upon the flow conditions and the characteristics of the gases employed. Also, if desired, a final baffle (not shown) could be an inverted cone with the point on the center line or axis of the diffuser 15.

While a particular embodiment of the invention has been described above in considerable detail in accordance with the applicable statutes, this is not to be taken as in any way limiting the invention, but merely as being descriptive thereof.

We claim:

1. In large-scale gas chromatography employing a packed column containing an adsorbent material in said column, the combination comprising
    a funnel-shaped diffusing member adapted for location at the inlet of said column;
    said inlet having a relatively small diameter compared to the diameter of said column;
    said diffusing member comprising a plurality of concentric funnel-shaped impervious baffles having small diameter open inlet ends toward the apexes thereof and facing toward said column inlet for spreading the flow of gas evenly over the cross-sectional area of said column.

2. The invention according to claim 1 wherein said open inlet ends of said funnel-shaped baffles extend axially toward the small diameter inlet of said column.

3. The invention according to claim 2, wherein said funnel-shaped baffles are flared out from said open inlet ends in a series of coaxial cone frusta toward said column.

4. The invention according to claim 3, wherein said column is upright, and wherein said diffusing member is located at the lower end of the column.

5. The invention according to claim 4, further including
    adjustable support means for varying the relative positions of said funnel-shaped baffles.

6. The invention according to claim 5, wherein said adjustable support means comprises threaded legs spaced 120° circumferentially apart about midway on said baffles.

7. The invention according to claim 3, wherein at least the outermost two of said funnel-shaped baffles terminate outwardly in cylindrical sections forming an annular axial passage therebetween.

8. In large-scale gas chromatography employing a packed column containing an adsorbent material in said column, in combination
    an inlet diffusing member comprising
    means for attaching a relatively small diameter inlet conduit coaxially with said column,
    a plurality of impervious frusto-conical flared sheet material sections joined axially in series and integral with said attaching means,
    said sections joining said conduit with said column and forming the outermost walls of said diffusing member,
    a second plurality impervious frusto-conical flared sheet material sections joined axially in series and located coaxially inside said first-named sections,
    said second sections having an open inlet toward the apex thereof and acting as a baffle and forming inner walls of an annular passageway for spreading out part of the gas flow through said inlet conduit toward the column,
    a plurality of additional frusto-conical flared sections located coaxially inside said second and succeeding sections and acting as baffles to form additional annular passageways, and
    means for attaching said second and additional inner section baffles to one another in order to hold them in place.

* * * * *